Jan. 1, 1929.
G. R. DAVENPORT
1,696,939
INTERNAL COMBUSTION ENGINE
Filed Aug. 16, 1926    2 Sheets-Sheet 1
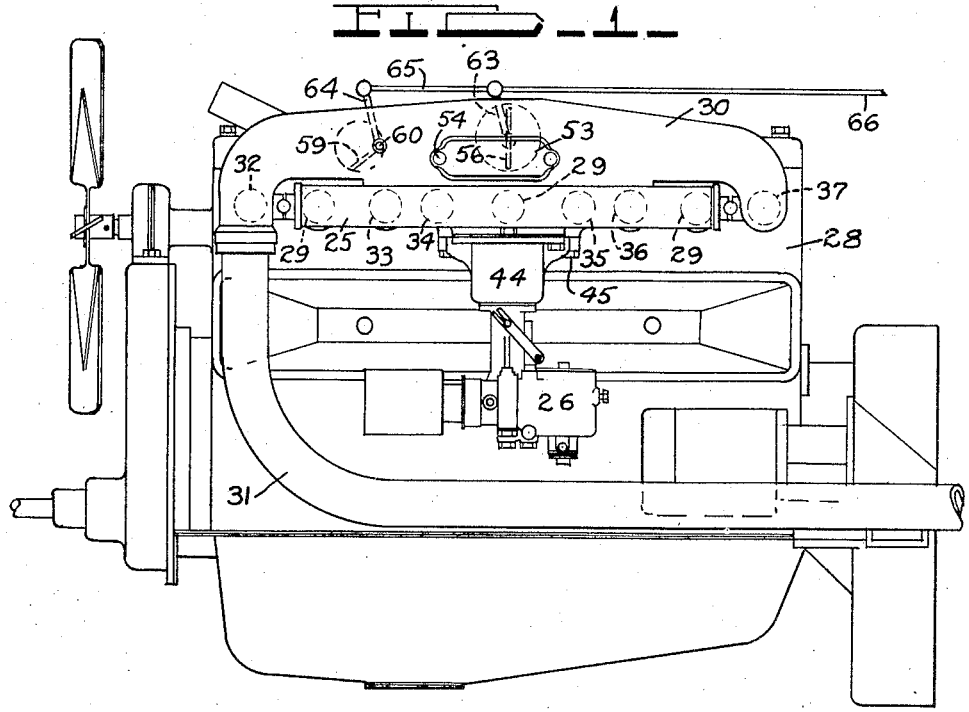
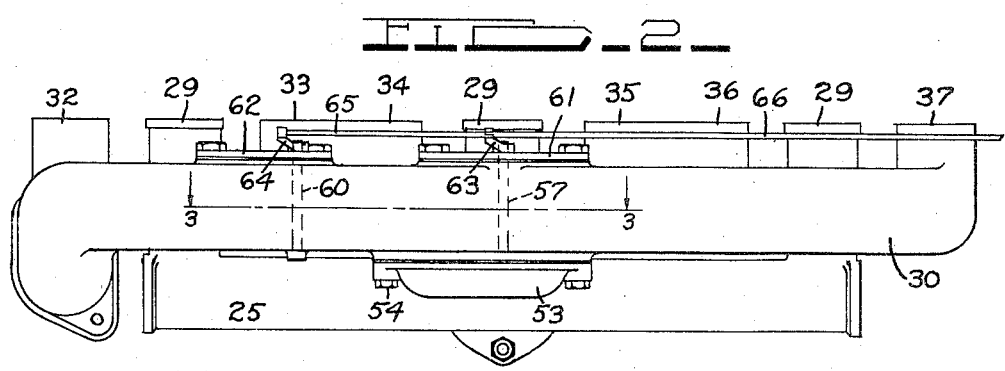
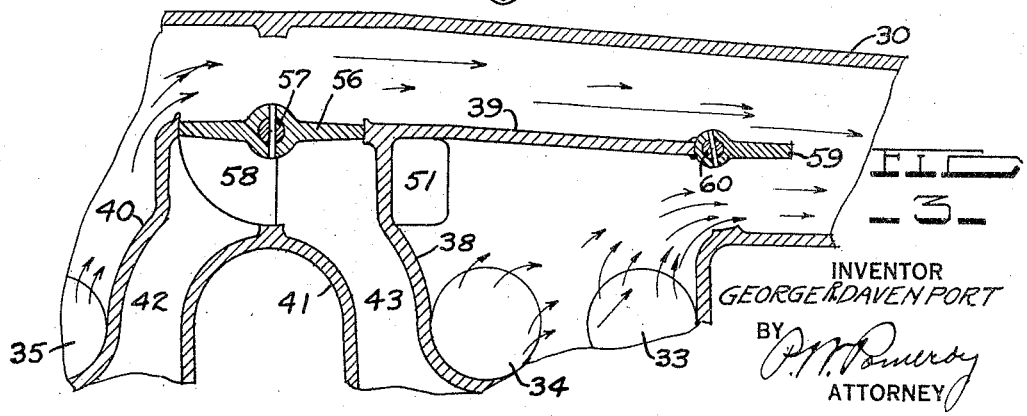
INVENTOR
GEORGE R. DAVENPORT
BY
*P. W. Pomeroy*
ATTORNEY

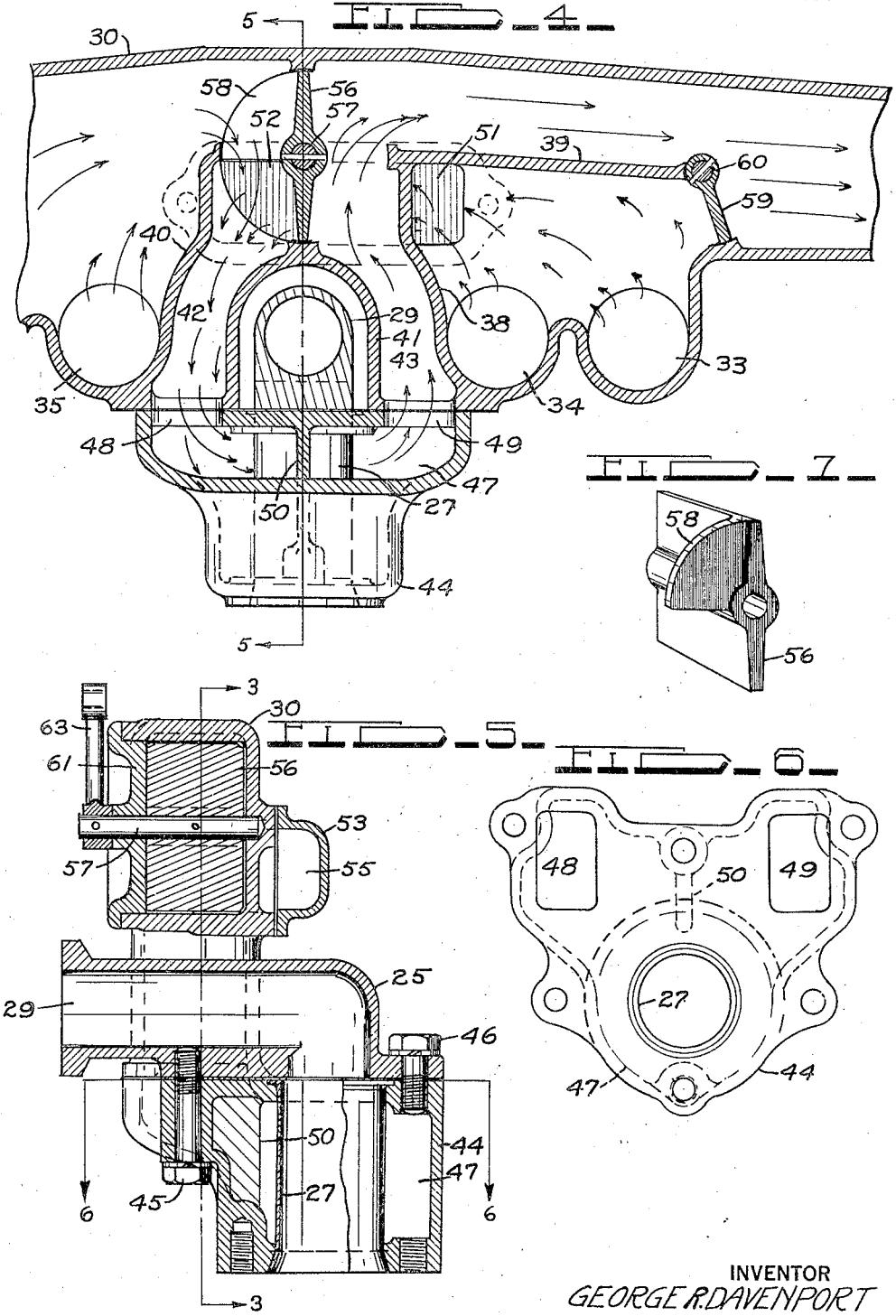

Patented Jan. 1, 1929.

1,696,939

UNITED STATES PATENT OFFICE.

GEORGE R. DAVENPORT, OF ROYAL OAK, MICHIGAN, ASSIGNOR TO THE STUDEBAKER CORPORATION, OF SOUTH BEND, INDIANA, A CORPORATION OF NEW JERSEY.

INTERNAL-COMBUSTION ENGINE.

Application filed August 16, 1926. Serial No. 129,423.

This invention relates to internal combustion engines, and particularly to manifolds therefor having means for heating a portion of the intake manifold by hot gases from the exhaust manifold and for controlling such heat.

The principal object of the present invention is to provide a simple and effective construction for transmitting the heat from the exhaust gases of an internal combustion engine to the combustible mixture flowing through the intake manifold, together with means for variably controlling the amount of such heat.

Another object is to provide an intake manifold with a jacketed portion connected to an exhaust manifold by a pair of conduits, a pair of valves being disposed within the exhaust manifold for conducting gases therefrom through one of the conduits to the jacket and from the jacket through the other conduit back to the exhaust manifold, in such quantities as may be desired.

Another object is to provide an intake manifold having a jacketed portion midway between the ends of an exhaust manifold, conduits joining the jacket with the exhaust manifold, and baffles and valves within the exhaust manifold whereby part of the gases in said exhaust manifold are temporarily deflected from their normal path through the jacket, and other of said gases are reversed in the direction of a part of their normal travel and also caused to pass through the jacket.

A further object is to provide an intake manifold with a jacket portion adjacent the center of an exhaust manifold, the exhaust manifold being provided with a pair of spaced vertically extending internal baffles and a horizontal baffle extending in the direction of normal travel of the exhaust gases from that vertically extending baffle nearest the discharge end of the exhaust manifold, a pair of conduits connecting the jacket with the space between the vertically extending baffles and a conduit connecting the space below the horizontal baffle with the conduit which leads the exhaust gases to the jacket, a valve being disposed within the exhaust manifold between the vertically extending baffles whereby it may be swung to block off the center of the exhaust manifold and force the gases traveling toward it through the jacket, and a second valve at the free end of the horizontal baffle swingable to block the exhaust manifold below it and to force the exhaust gases flowing toward it below the horizontal baffle back and through the jacket with the other exhaust gases.

The above being among the objects of the present invention, the same consists of certain features of construction and combinations of parts to be hereinafter described with reference to the accompanying drawings, and then claimed, having the above and other objects in view.

In the accompanying drawings, which illustrate a suitable embodiment of the present invention, and in which like numerals refer to like parts throughout the several different views, Figure 1 is a side view of an internal combustion engine provided with manifolds embodying the present invention.

Figure 2 is an enlarged top view of the intake and exhaust manifolds shown in side view on the engine in Figure 1.

Figure 3 is an enlarged fragmentary sectional view of the exhaust manifold taken looking from the back side of the manifold as on the lines 3—3 of Figures 2 and 5, showing the exhaust gas controlling valves in the position in which no heat is transferred to the intake manifold.

Figure 4 is a view similar to Figure 3 but showing the heating jacket around the intake manifold, and showing the exhaust gas controlling valves in the position in which full heat is transferred to the intake manifold.

Figure 5 is a sectional view through the intake and exhaust manifolds taken on the line 5—5 of Figure 4.

Figure 6 is a top view of the jacket around the intake manifold as on the line 6—6 of Figure 5.

Figure 7 is a perspective view of the main controlling valve which is positioned in the center of the exhaust manifold.

As indicated in the drawings, the intake manifold is of very simple design and comprises a straight cylindrical portion 25 which receives the combustible mixture from the carburetor 26, communicating therewith through the medium of the thin tube 27 extending downwardly therefrom at its center, and which distributes the combustible mixture to the different pairs of cylinders enclosed within the cylinder block 28 by means of the cross passages 29 which communicate with the intake port openings of the various cylinders.

The exhaust manifold 30, which discharges the exhaust gases into the exhaust pipe 31 at the forward end of the engine in the particular embodiment shown, is positioned closer to the cylinder block 28 than the intake manifold. The engine shown is one with six cylinders and for that reason six ports or passages 32, 33, 34, 35, 36 and 37 connect the exhaust ports of the engine with the interior of the exhaust manifold, they being arranged in the conventional order with the passages 33 and 34, and 35 and 36 lying in adjacent relationship and being formed together over a part of their surface. The rear wall of the passage 34, which extends completely across the exhaust manifold 30, is extended upwardly and slightly rearwardly to a point approximately midway the normal depth of the manifold 30 to form a baffle 38, and another baffle 39 continues horizontally across the manifold 30 from the upper edge of the baffle 38 to a point approximately in line with the forward wall of the passage 33. A third baffle 40, similar to the baffle 38 but reversed in direction, extends upwardly from the front wall of the passage 35 to a point in horizontal line with the upper edge of the baffle 38. The lower center portion of the manifold 30 between the baffles 38 and 40 is cored out to allow the center passage 29 of the intake manifold to pass therethrough, thus providing a wall 41 which divides the space between the lower parts of the baffles 38 and 40 into two passageways or ducts 42 and 43 which terminate in a flat flanged surface against which the upper surface of the intake manifold heating jacket 44 is secured by screws such as 45. The distributor pipe portion 25 of the intake manifold is also secured to the upper surface of the jacket 44 by screws such as 46 and, as previously described, contains the tube 27 which connects the distributor portion 25 of the intake manifold with the carburetor 26.

The jacket 44 is a hollow casting in which the tube 27 is centrally located so as to provide a passage 47 therearound between it and the interior walls of the jacket, the tube 27 being of relatively thin metal capable of a quick transfer of heat therethrough and is secured in place by an outwardly turned flange at its upper edge, which is set in flush with the upper face of the jacket 44, and the lower end of which is expanded into the tapered opening in the lower wall of the jacket through which it passes, thus providing an air tight joint at either end. The rear side of the jacket 44 is extended back toward the center of the engine and is provided with two openings 48 and 49 which connect with and connect the passage 47 of the jacket 44 with the ducts 42 and 43 of the exhaust manifold 30. A vertical baffle 50 is provided in the jacket 44 between the openings 48 and 49 and extends from the rear or inner face to a point adjacent the tube 27 so that any gases entering the duct 42 must pass completely around the tube 27 before passing out through the duct 43 and back into the exhaust manifold 30.

An opening 51 is provided in the front or face wall of the exhaust manifold 30 directly under the horizontal baffle 39 and immediately adjacent the vertical baffle 38, and a second opening 52 is provided in the same face between the vertical baffles 38 and 40, this latter opening being the shape of a quarter of a circle with one of its radial sides lying vertical just rearwardly of the center line between the baffles 38 and 40 and extending from the wall 41 to a point in line with the upper edges of the baffles 38 and 40, and its remaining radial side lying horizontally and extending from the center line between the baffles rearwardly to the baffle 40 in line with the upper ends of the baffles 38 and 40. A cored covered plate 53 is secured to the face of the exhaust manifold 30, by screws such as 54, and overlies the openings 51 and 52, its cored-out interior providing a passage 55 connecting the two openings, and therefore connecting that part of the exhaust manifold 31 below the baffle 39 and forwardly of the baffle 38 with the duct 42.

A butterfly valve 56 secured to a rotatable shaft 57 extends between the forward and rear walls of the exhaust manifold 30 midway between the upper ends of the vertical baffles 38 and 40, and the upper end of the walls 41, it being so positioned with respect to the baffles, that when the valve 56 is turned to horizontal position it extends between the upper ends of the baffles 38 and 40 and completely closes the space therebetween, and when swung to vertical position it extends between the upper end of the wall 41 and the upper wall of the manifold 30 and completely closes the space between these two points. The valve 56 is provided at its forward edge with a radial extension 58 of the same shape as the opening 52, and this extension is so positioned that when the valve 56 is in horizontal position, as indicated in Figure 3, the extension 58 overlies and shuts off the opening 52 and thereby prevents any exhaust gas from circulating through the passage 55.

A second valve 59, secured to the rotatable shaft 60 along one edge thereof, and extending between the front and rear walls of the exhaust manifold, is positioned at the forward edge of the horizontal baffle 39, and is swingable from the horizontal position shown in Figure 3 to the approximately vertical position shown in Figure 4 in which position it extends from the forward end of the baffle 39 to the lower wall of the intake manifold, so that the exhaust gases from the ports or passages 33 and 34 are prevented from passing thereby.

The valve 56 and shaft 57 are introduced into the exhaust manifold 30 through an opening in the back wall of the manifold which is closed by the cover plate 61 which provides a bearing for the rear end of the shaft 57, and the valve 59 and shaft 60 are introduced in the same manner through an opening which is closed by the cover 62. The shaft 57 is provided with a lever 63 on its inner end which projects past the cover plate 61, and the shaft 60 is provided with a similar lever 64. The free ends of the levers 63 and 64 are connected together to move in unison by means of a link 65 pivotally connected to each lever. In view of the fact that the valve 59 does not require as great a rotational movement as the valve 56 to move it from one extreme position to the other, the lever 63 is made proportionally shorter than the lever 64 so that when one valve is moved from one extreme position to the other, the other valve is caused to also move between its extreme positions. A rod such as 66, or other suitable means as may be found desirable, is connected to the free end of the lever 63 and extended to an instrument board or other control point so that the valves 56 and 59 may be manually controlled therefrom.

The operation is readily apparent. When the rod 66 is moved to its extreme rearward position the valve 56 extends between the upper ends of the baffles 38 and 40 and closes the space therebetween to the passage of any gases, the extension 58 at the same time covering the opening 52 and preventing any gas from passing therethrough. The valve 59 is caused by the link 65 to also move to a horizontal position as indicated in Figure 3. When the valves 56 and 59 are in this horizontal position, the exhaust gases from the engine entering the passages or ports 35, 36 and 37 pass up over the baffle 40, the valve 56, baffles 38 and 39 and out of the discharge end of the manifold without coming in contact with any part of the intake manifold. The exhaust gases entering the ports or passages 33 and 34 likewise pass directly to the discharge end of the exhaust manifold 30 without coming in contact with any part of the intake manifold because the passage 55 and opening 52 are blocked by the extension 58 on the valve 56. The exhaust gases entering the port or passage 32, which is immediately adjacent the discharge end of the manifold, pass directly out of the same in any case. The path of the exhaust gases, when the valves 56 and 59 are in the horizontal position just explained, is indicated by the arrows and readily discernible in Figure 3.

When full heat is desired on the intake manifold, the rod 66 is moved to its extreme forward position which moves the valves 56 and 59 to their other extreme position, as shown in Figure 4, the valve 56 turning until it extends between the upper wall of the exhaust manifold and the upper edge of the wall 41, thus preventing the exhaust gases from passing directly thereby. When the valve 56 is thus turned to its vertical position the extension 58 is rotated with it and is moved up and away from the opening 52, uncovering the same. At the same time the forward valve 59, which is connected to the valve 56 through the medium of the levers 63 and 64 and the link 65, is rotated until its free edge abuts against the lower manifold wall as indicated in Figure 4. When the valve 59 is in this position, no exhaust gases from the ports or passages 33 and 34 can pass forwardly thereby. The exhaust gases from the ports or passages 35, 36 and 37, in this case, pass forwardly over the baffle 40 and at this point their forward progress is stopped by the valve 56 which directs them downward through the duct 42 into the jacket 44 where the baffle 50 causes them to follow the passage 47 out around the outer face of the tube 27 and then back on the other side where they pass up through the duct 43 and back into the exhaust manifold 30 over the baffles 38 and 39 and travel forward to the discharge end of the exhaust manifold. At the same time, the exhaust gases entering the exhaust manifold 30 through the ports 33 and 34, are prevented from passing the valve 59, and are forced out through the opening 51 into the exterior passage 55 and then back through the opening 52 into the duct 42 where they mingle with the exhaust gases from the ports or passages 35, 36 and 37 and pass down around the tube 27 and back out the duct 43 as previously explained.

It is thus seen that the exhaust gases from five of the six cylinders pass around the thin tube 27 when the valves are in this position, transferring a maximum of heat to the combustible mixture flowing through the tube 27 from the carburetor 26 which is in open communication therewith and which is secured to the bottom face of the jacket 44. It will be evident that the exhaust gases from all six of the cylinders might be caused to pass around the tube 27 in the above described manner if the discharge end of the manifold were extended and the baffle 39 extended forwardly of it in the same relative position as it is shown in the drawings in relation to the port or passage 33, but the slight extra heat thus obtained would, in general, not balance the resulting extra cost and weight.

It will be evident that any variation of the position of the valves 56 and 59, between the two extreme positions shown and described, will cause a corresponding variation in the amount of heat transmitted to the combustible mixture through the walls of the tube 27, and that almost any desired amount of heat may be obtained in this way by shifting the axial position of the rod 66.

It will also be evident that this construction may be used as well on manifolds in which the exhaust gas is discharged from the rear end of the exhaust manifold instead of the forward end as in the construction shown, by simply reversing the construction end for end.

Formal changes may be made in the specific embodiment of the invention described without departing from the spirit or substance of the broad invention, the scope of which is commensurate with the appended claims.

What I claim is:

1. In an internal combustion engine, an intake manifold, an exhaust manifold, spaced upwardly projecting baffles within said exhaust manifold, a wall between said baffles providing a pair of ducts therebetween, a jacket surrounding a portion of said intake manifold communicating with said ducts, and a valve positioned between the ends of said baffles rotatable to close said ducts to the passage of gas in one position, and rotatable to force exhaust gases through said ducts in another position.

2. In an internal combustion engine, an intake manifold provided with a jacketed portion, an exhaust manifold provided with a pair of spaced baffles projecting upwardly into the interior thereof, a pair of passages leading from said jacket to the space between said baffles, and a valve in said exhaust manifold movable to one position to close the space between said baffles to the passage of exhaust gases and movable to another position between said passages whereby exhaust gases are forced through said jacket.

3. In an internal combustion engine, an intake manifold provided with a jacketed portion, an exhaust manifold provided with a pair of spaced baffles adjacent the center thereof extending from its lower wall to a point spaced from its upper wall, a pair of spaced openings leading from between said baffles to said jacket, and a valve movable to one position to connect said pair of baffles and movable to another position to block said exhaust manifold between said pair of baffles.

4. In an internal combustion engine, an intake manifold, an exhaust manifold provided with a pair of baffles projecting upwardly from its lower wall in spaced relationship, a pair of passages in the lower wall of said exhaust manifold between said baffles, a jacket surrounding a portioon of said intake manifold provided with passages communicating with said pair of passages, a valve in said exhaust manifold movable to one position to extend between said baffles and movable to another position to block said manifold between said baffles whereby the exhaust gases traveling toward said valve are forced through said jacket, and a baffle within said jacket for forcing said gases around said intake manifold enclosed therein.

5. In an internal combustion engine, an intake manifold provided with a jacket, an exhaust manifold in communication with said jacket, movable means within said exhaust manifold whereby when said means is moved to one position certain of the gases in said exhaust manifold are caused to circulate through said jacket and when moved to another position are prevented from circulating through said jacket, a second movable means within said exhaust manifold whereby when said second means is moved to one position other of said gases within said exhaust manifold are caused to circulate through said jacket and when moved to another position are prevented from circulating through said jacket, said two means being interconnected whereby movement of one causes movement of the other.

6. In an internal combustion engine, an intake manifold provided with a jacketed portion, an exhaust manifold provided with a plurality of passages through which exhaust gases are introduced therein, passages connecting said exhaust manifold with said jacket, means adjacent the longitudinal center of said exhaust manifold for causing exhaust gases entering the same on the side of said means opposite the discharge end of said exhaust manifold to pass through said jacket, and means spaced longitudinally from said center for causing exhaust gases entering said manifold on the discharge side of said center to pass through said jacket.

7. In an internal combustion engine, an intake manifold having a portion provided with a jacket, an exhaust manifold provided with passages communicating with said jacket, movable means within and adjacent the longitudinal center of said exhaust manifold for causing exhaust gases entering the same on the side of said means opposite the discharge end of said exhaust manifold to pass through said jacket, other movable means in said exhaust manifold positioned toward the discharge end of said exhaust manifold from the first-mentioned means for causing exhaust gases entering said exhaust manifold between both of said means to pass through said jacket, and mechanism connecting said two means whereby the movement of one is dependent upon the movement of the other.

8. In an internal combustion engine, an intake manifold having a jacketed portion, an exhaust manifold provided with ducts leading to and from said jacket, and cooperating valves and baffles within said exhaust manifold whereby part of the exhaust gases in said exhaust manifold may be deflected from its normal path through said jacket, and other parts of the exhaust gases in said exhaust manifold may be reversed in the direction of its normal travel and caused to pass through said jacket.

9. In an internal combustion engine, an intake manifold provided with a jacketed portion, an exhaust manifold provided with a pair of spaced upwardly extending baffles and a horizontally extending baffle, means connecting the space between said upwardly extending baffles with said jacket, means connecting the space under said horizontal baffle with said jacket, and movable means for blocking said exhaust manifold between said pair of baffles and for closing the space between the lower wall of said exhaust manifold and the end of said horizontally extending baffle nearest the discharge end of said exhaust manifold.

10. In an internal combustion engine, an intake manifold provided with a jacketed portion, an exhaust manifold provided with a pair of ducts adjacent its center in communication with said jacket, said ducts being positioned between a pair of baffles, a third baffle connected to one of said pair of baffles, and a pair of valves cooperating with said baffles to cause exhaust gases flowing toward said pair of baffles to be deflected through said ducts, and to cause a portion of the exhaust gases flowing away from said pair of baffles to be reversed from normal direction of flow and to pass through said ducts.

11. In an internal combustion engine, an intake manifold provided with a jacketed portion, an exhaust manifold provided with a pair of spaced baffles, a pair of ducts leading from between said baffles to said jacket, a horizontal baffle extending towards the discharge end of said exhaust manifold from the end of that baffle of said pair of baffles nearest said discharge end, a passage leading from under said horizontal baffle to the said duct most remote from said discharge end, a valve positioned to extend between said pair of baffles in one position and to extend between said ducts in another position, and a second valve movable to close the space between the free end of said horizontal baffle and the lower wall of said exhaust manifold.

12. In an internal combustion engine, an inlet manifold provided with a jacketed portion, an exhaust manifold provided with a plurality of passages through which exhaust gases are introduced thereinto, a pair of upwardly extending baffles between two of said passages, a horizontally extending baffle overlying one of said passages and joined to one of said upwardly extending baffles, a pair of passages connecting the space between said upwardly extending baffles and said jacket, means movable to direct the exhaust gases normally traveling toward said upwardly extending baffles into said jacket, a passage connecting the space under said horizontally extending baffle with said jacket, and means movable to direct the gases under said horizontally extending baffle through said last-mentioned passage.

13. In an internal combustion engine, an intake manifold provided with a jacket, an exhaust manifold, a duct connecting said exhaust manifold with said jacket, a valve in said exhaust manifold movable to close said duct, a second duct communicating with the first-mentioned duct, and means on said valve for closing said second duct.

14. In an internal combustion engine, an intake manifold provided with a jacket, an exhaust manifold provided with a pair of spaced baffles and a wall therebetween forming a pair of ducts in communication with said jacket, a rotatable valve between said baffles rotatable to close said ducts in one position and to block said exhaust manifold in another position, a third baffle joined to one of said spaced baffles, a third duct co-acting with said third baffle and communicating with one of said pair of ducts through an opening, and means on said valve for closing said opening when said valve is in position to close said pair of ducts.

Signed by me at Detroit, Michigan, U. S. A., this 11th day of August, 1926.

GEORGE R. DAVENPORT.